Figure 1:
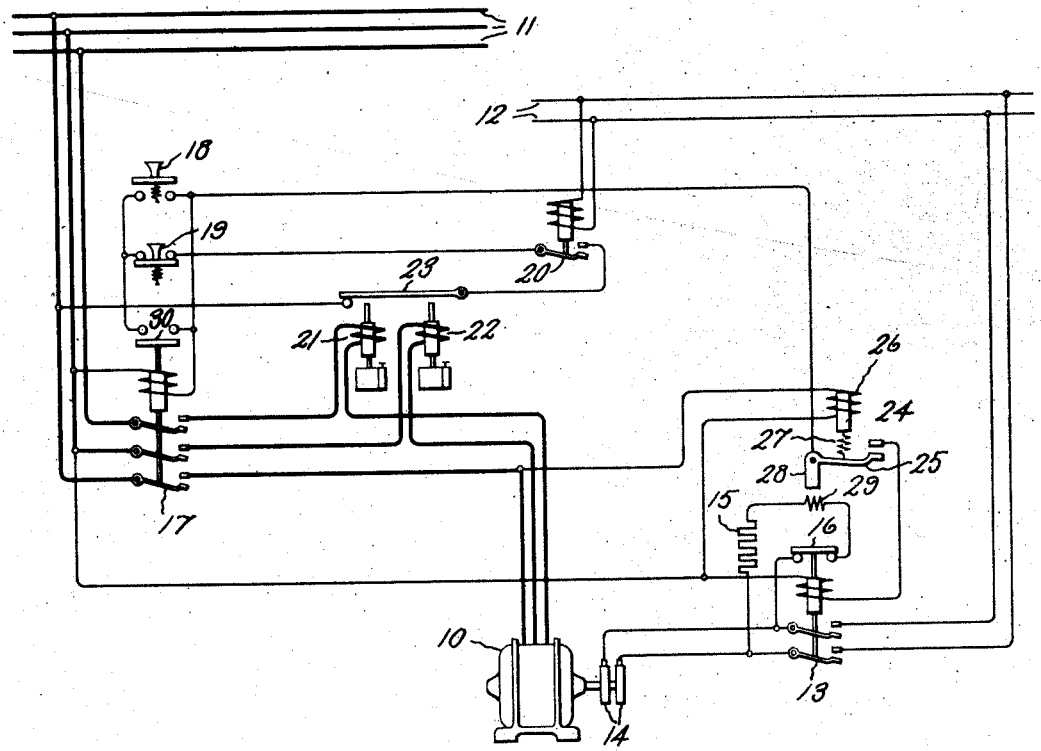

Sept. 25, 1928.  
L. C. HARDESTY  
1,685,671  
AUTOMATIC MOTOR STARTER  
Filed Oct. 15, 1924

Inventor:  
Llewellyn C. Hardesty,  
by *[signature]*  
His Attorney.

Patented Sept. 25, 1928.

1,685,671

UNITED STATES PATENT OFFICE.

LLEWELLYN C. HARDESTY, OF SCOTIA, NEW YORK, ASSIGNOR TO GENERAL ELECTRIC COMPANY, A CORPORATION OF NEW YORK.

AUTOMATIC MOTOR STARTER.

Application filed October 15, 1924. Serial No. 743,804.

My invention relates to improvements in automatic starters for motors arranged to start as asynchronous motors and to run as synchronous motors.

If the field winding of an alterating current motor arranged to start as an asynchronous motor and to run as a synchronous motor is included in a local circuit, that is, closed upon itself, when the armature or primary winding is connected to a suitable alternating current source of supply for starting, a current will be induced in the field winding local circuit during the starting of the motor. This induced current in the field winding circuit will be substantially constant in value and the frequency thereof will gradually decrease as the motor approaches its synchronous speed in the same manner as the current in the short circuited secondary of the motor. When the motor accelerates to substantially synchronous speed, the induced current in the short circuited secondary of the motor and in the field winding local circuit suddenly drops to substantially zero value.

This well known phenomena has been made use of in the control of automatic switch mechanism to effect the opening of the local circuit in which the field winding is included and the connection of the field winding to a direct current source of supply when the motor has reached substantial synchronism. However, such arrangements have heretofore left something to be desired for the reason that the conditions may be such that the motor will not accelerate to practically the synchronous speed with the field winding included in a local circuit and the automatic throw over to the direct current supply for the field winding will not take place. It has been proposed to employ a device which will in all cases connect the field winding to a direct current supply a definite interval of time after the connection of the armature of the motor to the alternating current supply. If the time interval is adjusted for one set of conditions, it will not take care of other conditions. Thus, under normal conditions, the proper value for the time interval will vary due to varying conditions and if the time interval is set at a definite value for these conditions, it will be at best only an approximation. If the time interval is set to take care of the abnormal conditions, it will be too long for the ordinary conditions encountered.

In accordance with the present invention, the timing action will be such that the motor will have more than sufficient time to reach substantially synchronous speed if conditions are right and if conditions are not right such as would be occasioned by an abnormal load, the field winding will be connected to the direct current supply eventually. If the conditions are then substantially correct, the motor will pull into step as a synchronous motor, but if the conditions are such that the motor should not operate as a synchronous motor, the alternating current supply circuit will be automatically opened. In order that no more time shall be taken than absolutely necessary for the ordinary or normal conditions, the timing action will be such that the operation will be substantially at the exact time that the motor has reached substantially the synchronous speed. Thus, when the acceleration of the motor is normal, the timing action will be such that the field winding will be automatically connected to the direct current source of supply practically at the exact time that the motor has reached substantially synchronous speed, but in case the acceleration of the motor is unduly prolonger, as would be the case if the load on the motor is materially higher than normal, the timing action will be such that a substantially definite interval of time after the motor is energized the field winding will be automatically connected to the direct current source, even though the acceleration of the motor has not proceeded to substantially synchronous speed. All conditions are thus taken care of. In other words, the timing action will be automatically adjusted to suit substantially exactly the normal conditions, but if the conditions are not right, the motor will be automatically disconnected from the alternating current supply.

Figure 2:
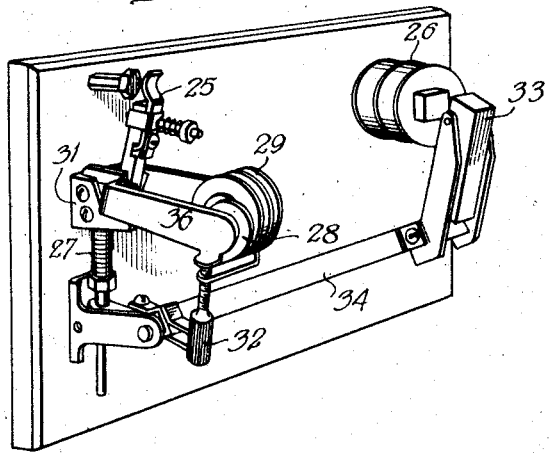
Figure 3:
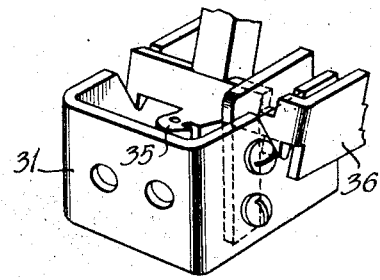

In the accompanying drawing, Fig. 1 is a very simplified diagram of a motor control system for an alternating current motor in accordance with the invention. Fig. 2 is a detail showing the construction of the time element relay indicated diagrammatically in the system of Fig. 1 and Fig. 3 is a detail of the time interval relay of Fig. 2, showing the arrangement for supporting the movable armature of the time element device.

In carrying my invention into effect in the form which I now regard as the preferred form, I employ a time interval relay of the type disclosed in the application of George E. Stack, Serial No. 636,456, filed May 3, 1923, although the invention is not necessarily limited to this particular type of time interval relay. Such a relay is shown in Figs. 2 and 3 of the drawing.

For a better understanding of the invention, reference is had to the accompanying drawing which shows in very simplified form an arrangement wherein the motor 10 is started in accordance with the invention. This motor is of the type arranged to start as an asynchronous motor receiving energy from the 3 phase alternating current supply circuit 11, and to run as a synchronous motor with the field windings of the motor energized from the direct current supply circuit 12. The motor will have a primary winding (not shown) and a short circuited secondary winding (not shown), the short circuited secondary being used for starting. The electroresponsive switch mechanism or contactor 13 is arranged so as to be normally in the position indicated in which the motor field windings (not shown) are included in a local circuit comprising the slip rings 14, the resistor 15 and the switch member 16. The motor field windings are thus normally connected in a local circuit for the starting of the motor, and the contactor 13 is arranged so that when its operating winding is energized, the local circuit is opened and these field windings are connected directly to the direct current supply circuit through the main contacts of the contactor 13. The primary of the motor is connected to the alternating current supply circuit by means of the line contactor 17 which is under the control of the start push button 18 and the stop push button 19. The arrangement is such that in case there is a failure of the direct current supply circuit, the contactor 17 cannot be energized to connect the motor to the alternating current supply circuit 11. This feature is provided for by means of the no-voltage relay 20 which has its coil energized from the direct current supply circuit 12 and which has its contacts in the coil circuit of the line contactor 17. The adjustable overload relays 21 and 22 are provided for cooperating with the relay switch member 23 to deenergize the line contactor 17 in case the current taken by the stator windings of the motor is in excess of a predetermined value.

The energization of the contactor 13 is controlled by means of a time interval relay 24 which is arranged so as to operate so as to give the heretofore referred to timing action.

I have shown this time interval relay very diagrammatically and for a complete understanding of the preferred construction and arrangement of the same, reference is had to the detailed description of the relay which will follow. Briefly, the relay comprises a switch member 25 which is normally in the position shown, that is, out of circuit making contact with its cooperating stationary contact. When the motor is connected initially to the alternating current supply circuit, the electromagnet 26 will be energized by the closing of the line contactor 17 to place the switch member 25 under strain to the closed position by reason of the fact that the magnetic movable member of the electromagnet 26 is connected to the switch member 25 through the spring 27. Secured to the switch member 25 and cooperating therewith is the magnetic movable element or armature 28 of an electromagnet, the coil 29 of which is energized responsively to the current induced in the local circuit in which the motor field windings are included during starting. The frequency of the current which energizes the retarding winding 29 will vary as the motor accelerates during the starting interval, although the value of the current which energizes this winding 29 will remain substantially constant until the motor speed has reached substantial synchronism, at which time the value of the current drops practically to zero so that the armature 28 is released and the switch member 25 permitted to close the circuit for the coil of contactor 13. During the starting interval the coil 29 will alternately hold and release the armature 28 so that the switch member 25 will be permitted to move step by step to the closed position. It will be understood that possibly for a very short period after the connection of the motor to the supply circuit the frequency of the current induced in the field winding will be so high that the relay armature may not proceed step by step, but this will be an advantage in obtaining a sufficient time interval.

The construction of the Stack time element device is better understood by reference to Figs. 2 and 3, wherein the switch member 25 of the device is connected with the armature 28 which cooperates with the electromagnet 29. This contact member and the armature are pivotally mounted in the support 31 and the position of the armature 28 with reference to the core of the electromagnet 29 is adjusted by means of the set screw 32. The contact 25 is connected with the armature 33 associated with the electromagnet 26 by means of the spring 27 which is interposed between the pivotally mounted shaft 34 on which the armature 33 is mounted and the projection 35 of the support 36 for the armature 28 associated with the electromagnet 29. In general the operation of this device is as follows: When the winding of the electromagnet 26 is energized by the closing of the line contactor 17 and the winding of the electromagnet 29 is energized by the current induced in the rotor circuit of the motor, the armature 33 will be directly attracted to the core of the electromagnet 26 and thus place the spring 27 under a strain. This in turn places the contact 25 under a strain to make engagement with its cooperating stationary contact, but the contact 25 is prevented from moving directly to the closed position by reason of the holding action of the electromagnet 29 on the armature 28. As the flux set up by the winding of the electromagnet 29 alternately releases and holds the armature 28, this armature will skip across the end of the core of the electromagnet 29, gradually approaching the position of least reluctance for the flux set up by the winding of the electromagnet 29. The contact 25 thus moves step by step toward the closed position and when the motor speed has increased to practically the synchronous value, the electromagnet 29 is practically deenergized so that if the switch member 25 has not already operated to the closed position, it will do so promptly. The time interval thus introduced is never greater than a definite time interval, but in case the motor has accelerated to substantially the synchronous speed, this time interval is correspondingly shortened.

The operation of my invention as thus constructed and arranged, is as follows: In order to start the motor 10 the push button 18 will be closed, thereby energizing the coil of line contactor 17 from the middle supply conductor, through the contacts of the start push button 18, contacts of the stop push button 19, contacts of no voltage relay 20 (it has been assumed that the voltage of the direct current supply circuit 12 is the normal value) through the switch member 23 of the overload relays 21 and 22 to the left-hand alternating current supply conductor. The line contactor 17 will thus be energized to close and in closing will close the auxiliary switch 30, thereby establishing a maintaining circuit for the line contactor independently of the push button 18, so that the push button 18 may be released and the line contactor will be maintained closed. The motor 10 will start as an asynchronous motor and the field windings of the motor will be connected in the local circuit including the switch member 16 of the contactor 13. When the line contactor 17 closes, the switch member 25 of the time interval relay will be put under a strain to the closed position by reason of the energization of the coil 26, but the operation of the switch member to the closed position will be retarded by means of the armature 28.

The armature 28 of the time interval relay will be alternately held and released synchronously with the alternations of the current induced in the local circuit in which the motor field windings are included, but each time that the armature is released, it will advance a step so that the switch member 25 will thus be permitted to advance step by step from the open position to the closed position. If the motor speed reaches substantially the synchronous speed before the time interval for which the relay 24 is set has elapsed, the coil 29 will be substantially deenergized when the motor has reached the synchronous speed and the armature 28 will be completely released so that the switch member 25 may directly close the cooperating contacts. The contactor 13 is thus energized to open the local circuit in which the motor field windings are included and connect these field windings to the direct current supply circuit 12. However, if the load on the motor is higher than normal and the acceleration of the motor to substantially the synchronous speed is unduly prolonged, the switch member 25 will nevertheless eventually close its contacts and energize the field contactor 13. If the motor is at this time running somewhere near the synchronous speed, the motor may pull into step and operate as a synchronous motor, but if the motor speed is materially different than the synchronous speed, the closing of the field contactor 13 will cause a rush of current from the alternating current supply circuit 11 to the stator windings of the motor so that the overload relays 21 and 22 will operate and disconnect the motor from the supply circuit by the opening of the line contactor 17. The opening of the line contactor 17 will in turn deenergize the coil 26 of the time interval relay so that this relay will return to the position shown in the drawing, thus including the motor field windings in the local circuit.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. In combination, an alternating current motor having a field winding arranged to be connected to a direct current source of supply for synchronous running of the motor, the said motor being arranged to start as an asynchronous motor and to run as a synchronous motor, and a time interval device connected with said motor to be set in operation in response to the energization of the motor to effect the connection of said field winding to said direct current source, the said device being provided with means controlled by the motor for regulating the timing thereof to effect said connection when the motor accelerates normally to substantially synchronous speed, and in case there is a prolonged acceleration of the motor so that substantially synchronous speed is not reached before a certain time interval has elapsed after the energization of the motor, to effect said connection at the expiration of said time interval.

2. In combination, an alternating current motor arranged to start as an asynchronous motor and to run as a synchronous motor, electroresponsive switch mechanism for connecting the field windings of said motor to a direct current supply circuit for running, and means for controlling the said switch mechanism comprising a time interval relay set in operation responsively to the energization of said motor and retarded responsively to the speed of the motor to operate when the motor accelerates normally to substantially synchronous speed and in case there is a prolonged acceleration of the motor so that substantially synchronous speed is not reached before a certain time interval has elapsed after the energization of the motor to operate at the expiration of said time interval.

3. In combination, an alternating current motor having a primary winding and a secondary winding and arranged to start as an asynchronous motor and to run as a synchronous motor, electroresponsive switch mechanism for connecting the field windings of said motor to a direct current supply circuit for running, and means for controlling the said switch mechanism comprising an electroresponsive relay which is connected to be energized and set in operation responsively to the energization of the motor, and which is retarded responsively to the frequency of the current induced in the secondary of the motor to operate when the motor accelerates normally to substantially synchronous speed and in case there is a prolonged acceleration of the motor so that substantially synchronous speed is not reached before a certain time interval has elapsed after the energization of the motor to operate at the expiration of said time interval 4. In combination, an alternating current motor arranged to start as an asynchronous motor and to run as a synchronous motor, electroresponsive switch mechanism biased to normally include the motor field windings in a local circuit for starting and arranged to open the local circuit and connect the field windings to a direct current supply circuit for running, and means for controlling the operation of said switch mechanism comprising a time interval relay set in operation responsively to the energization of said motor and retarded responsively to the current induced in said local circuit to operate when the motor accelerates normally to substantially synchronous speed and in case there is a prolonged acceleration of the motor so that substantially synchronous speed is not reached before a certain time interval has elapsed after the energization of the motor to operate at the expiration of said time interval.

5. In combination, an alternating current motor arranged to start as an asynchronous motor and to run as a synchronous motor, electroresponsive switch mechanism biased to normally include the motor field winding in a local circuit for starting and arranged open the local circuit and connect the field winding to a direct current supply circuit for running, a time interval relay for controlling the said switch mechanism to regulate the opening of the said local circuit and the connection of the field winding to the direct current supply circuit, and means energized responsively to the current induced in said field winding for regulating the said relay to operate when the motor accelerates normally to substantially synchronous speed and in case there is a prolonged acceleration of the motor so that substantially synchronous speed is not reached before a certain time interval has elapsed after the energization of the motor to operate at the expiration of said time interval.

6. In combination, an alternating current motor arranged to start as an asynchronous motor and to run as a synchronous motor, electroresponsive switch mechanism biased to normally include the motor field windings in a local circuit for starting and arranged to open the local circuit and connect the field windings to a direct current supply circuit for running, means for controlling the operation of said switch mechanism comprising a time interval relay having a switch member normally in one position and movable to a second position to effect the operation of said switch mechanism, means operated responsively to the connection of the motor to an alternating current supply circuit for placing the said switch member under strain to the second position, an electroresponsive means energized responsively to the current induced in said field winding for alternately retarding and releasing the said switch member to cause the same to move step by step to the second position while the motor speed is substantially below synchronous speed and to release the said switch member to move directly to the second position when the speed of the motor has reached substantially synchronous speed.

In witness whereof, I have hereunto set my hand this 13th day of October, 1924.

LLEWELLYN C. HARDESTY.